United States Patent [19] [11] 4,203,498
Kodama [45] May 20, 1980

[54] TRANSMISSION APPARATUS FOR MOTOR VEHICLE

[75] Inventor: Masayuki Kodama, Tokyo, Japan

[73] Assignee: Fugi Jukogyo Kabushiki Kaisha, Tokyo, Japan

[21] Appl. No.: 918,336

[22] Filed: Jun. 23, 1978

[51] Int. Cl.² ............................................. B60K 17/06
[52] U.S. Cl. ................................. 180/70 MS; 74/745
[58] Field of Search .................. 180/44 R, 49, 51, 52, 180/70 MS; 74/740, 745, 665 F, 700, 360, 701, 694, 695

[56] References Cited

U.S. PATENT DOCUMENTS

| | | | |
|---|---|---|---|
| 2,796,943 | 6/1957 | Rolt | 180/44 R |
| 2,821,868 | 2/1958 | Gregory | 74/745 |
| 3,255,644 | 6/1966 | Warren | 74/745 |
| 3,561,291 | 2/1971 | Webster | 74/745 |
| 3,580,350 | 5/1971 | Duntov | 180/44 R |

Primary Examiner—John J. Love
Assistant Examiner—Randall A. Schrecengost
Attorney, Agent, or Firm—Martin A. Farber

[57] ABSTRACT

A transmission apparatus for motor vehicle in which the engine is positioned in front side of the front axle, a sub-transmission is provided in the space formed above the front axle, and a main transmission is adapted to transmit the output of the sub-transmission to the front wheels through means for transmitting the output.

5 Claims, 4 Drawing Figures

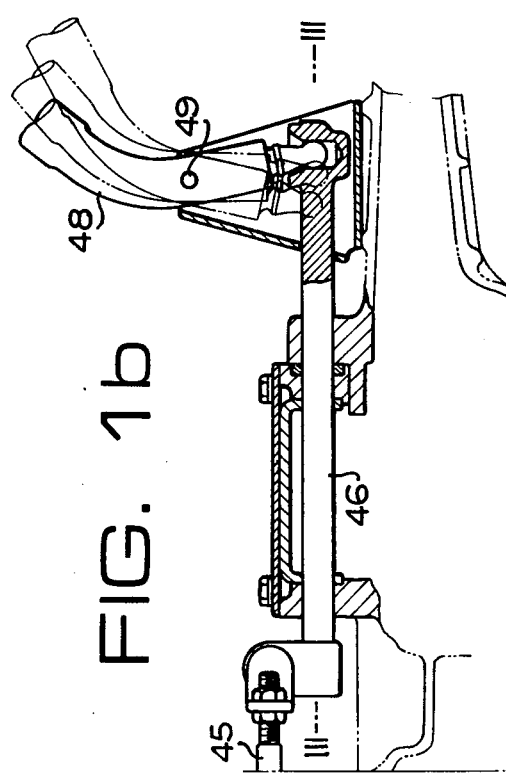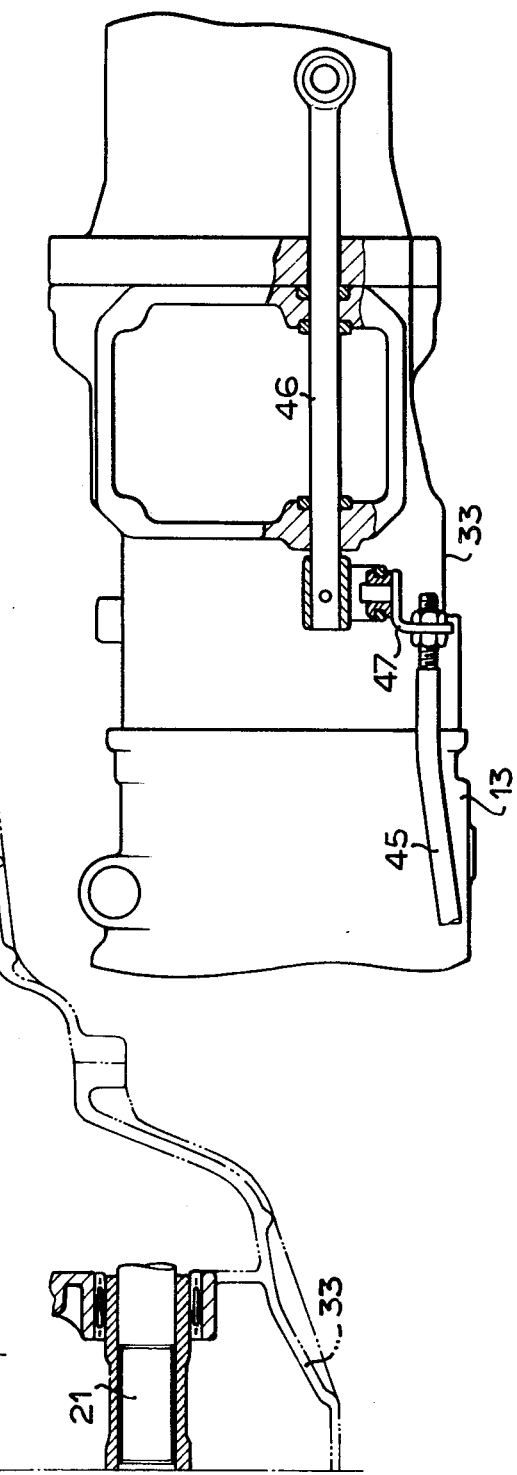

TRANSMISSION APPARATUS FOR MOTOR VEHICLE

BACKGROUND OF THE INVENTION

The present invention relates to a transmission apparatus for motor vehicles in which the engine is longitudinally mounted in the front position of the vehicle and the output of the engine is transmitted to the front axle to drive the motor vehicle.

In recent years, there requirements have increased for the transmission to have a wide performance range. One of the requirements is that the motor vehicle can be economically driven at a high speed with low reduction ratio, and the other is that the vehicle can be powerfully driven under a heavy load condition with a higher reduction ratio than the conventional highest reduction rate.

Typical means for meeting such requirements is to increase the changing speed stages of the transmission in the number of the stages. However, this means results in complexity of manipulation for changing the speed of the transmission, thereby to decrease its practicability. In order to remove such disadvantages, it has been proposed to provide a sub-transmission together with the main transmission of which sub-transmission may be manipulated to change the transmission speed independent of the main transmission. If there is provided with a main transmission having a four-speed-stage and a sub-transmission having a two-speed-stage, the transmission having a eight-speed-stage may be obtained. Namely, when the sub-transmission is set in the lower speed stage, the main transmission can transmit four speeds in the lower speed range, and when the sub-transmission is set in the higher speed stage, four speeds in the higher speed range can be transmitted through the main transmission. In accordance with this sub-transmission apparatus, the manipulation is simply performed, because the main transmission may be manipulated in four stages. However, it is necessary to provide a special space in the transmission housing for the sub-transmission, which results in an increase of size of the transmission in dimensions, especially in length.

On the other hand, in the front wheel drive car, the engine should be mounted near the front axle for increasing the load on the front wheels to increase the gripping force of the front wheel against the ground.

If the long transmission is longitudinally mounted in the front position of the car, the engine must be extended forward from the front wheels more than the conventional car or the transmission must be positioned rearwardly whereby the space for the driver in the car is reduced. If the length from the front wheels to the front end of the car becomes long, it will become difficult to manipulate the steering wheel of the car.

Further, in the case that the sub-transmission is provided to transmit the output of the main transmission, the sub-transmission must be designed to have great dimensional size. If the inertia lock type synchromesh mechanism is employed in such a sub-transmission, inertia mass of the synchronized members in the mechanism will be great value, which makes the manipulation of the sub-transmission heavy.

Therefore, it is the object of the present invention to provide a transmission apparatus which need not provide a special space for the sub-transmission in the transmission housing, which may be manufactured in small size, and which sub-transmission may be easily manipulated.

SUMMARY OF THE INVENTION

In accordance with the present invention, an engine is longitudinally provided at the front side, i.e. in front of the front axle F of the vehicle, a first main drive shaft is co-axially connected to the clutch device of the engine, and the end of the first main drive shaft is inserted into the transmission case co-axially to the first main drive shaft, a sub-transmission is provided above the front axle F for transmitting the output of the first main drive shaft to the second main drive shaft, the sub-transmission having a 2-speed gear ratio including counter gears for reducing the speed and a synchromesh mechanism for selectively coupling the output end of the first drive shaft and the output end of said sub-transmission to the second main drive shaft, a third main drive shaft is provided in the transmission case in parallel to said second main drive shaft, a main transmission is provided on the second and third main drive shafts comprising a plurality of reduction gear trains and synchromesh mechanisms for selectively engaging the gears thereof on said both drive shafts, a hypoid pinion is provided on an end of the third main drive shaft, and a final reduction gear provided on said front axle F meshes with the hypoid pinion, the final reduction gear being position in the transmission case beneath the sub-transmission. These and other advantages of the invention will be more clearly understood from the following description taken together with the accompanying drawings.

BRIEF DESCRIPTION OF THE DRAWINGS:

FIG. 1b is a sectional view showing a right half of the embodiment.

DESCRIPTION OF THE PREFERRED EMBODIMENT

Figure 1A:
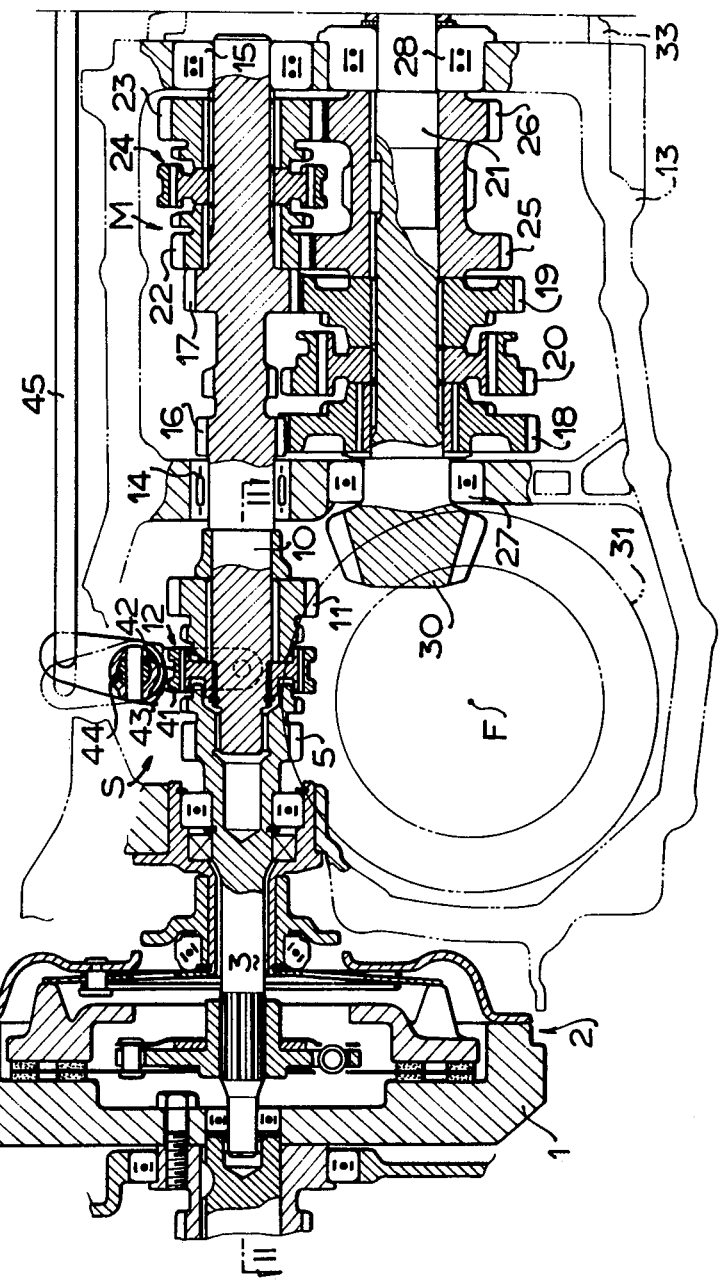
FIG. 1a is a sectional view showing a left half of an embodiment of the present invention.
Figure 2:
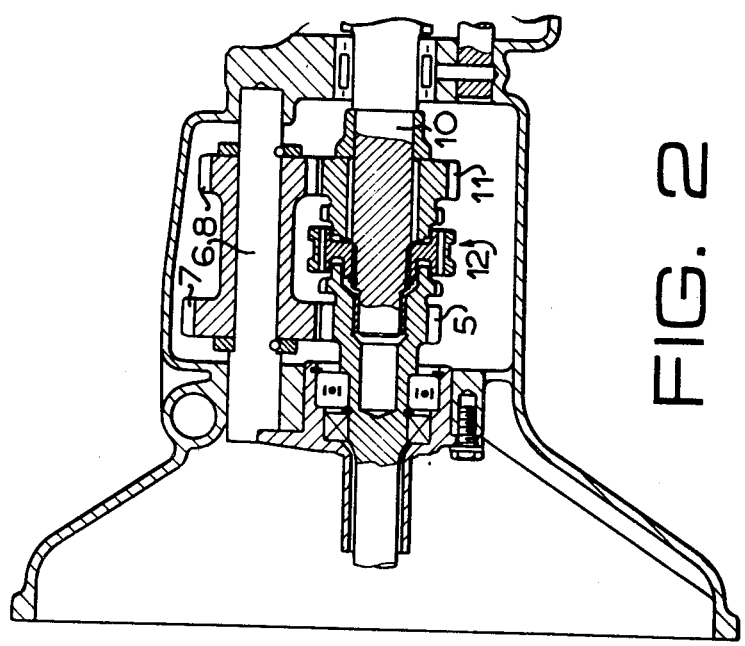
FIG. 2 is a sectional view taken along the line II—II in FIG. 1a, and FIG. 3 is a sectional view taken along the line III—III in FIG. 1b.

Referring to the drawings, numeral 1 designates a flywheel secured to the end of the crankshaft of the engine which is longitudinally disposed in the front portion of car. A first main drive shaft 3 in alignment with the crankshaft is rotatably supported and a clutch device 2 is provided on the first main drive shaft to engage with the flywheel 1. A 2-speed sub-transmission S is positioned above the front axle F and provided to transmit the power of the engine to a second main drive shaft 10. The sub-transmission S comprises a gear 5 formed on the first main drive shaft 3, counter gears 7 and 8 rotatably mounted on a counter shaft 6, a gear 11 rotatably mounted on the second main drive shaft 10, and a synchromesh mechanism 12 mounted on the second main drive shaft 10 with the spline. The gears 5 and 11 mesh with the gears 7 and 8, respectively.

The second main drive shaft 10 is in alignment with the first main drive shaft 3 and extended into a transmission case 13 of a 4-speed main transmission M and rotatably supported by bearings 14 and 15. The main transmission M comprises a lower 2-speed transmission device and a higher 2 -speed transmission device. The lower 2-speed transmission device comprises gears 16 and 17 formed on the second main drive shaft 10, gears 18 and 19 rotatably mounted on a third main drive shaft 21 and engaged with the gears 16 and 17, respectively, and a lower speed stage synchromesh mechanism 20 splined on the shaft 21 between the gears 18 and 19. The higher 2-speed transmission device comprises gears 22 and 23 rotatably mounted on the second main drive shaft 10, a higher speed stage synchromesh mechanism 24 splined on the shaft 10 between the gears 22 and 23, gears 25 and 26 keyed on the third main drive shaft 21 and engaged with the gears 22 and 23 respectively. It should be noted that the back gear mechanism is not shown in the drawings.

The third main drive shaft 21 is rotatably supported by bearings 27 and 28 and provided with a hypoid pinion 30 formed at the front end thereof. The hypoid pinion 30 meshes with a ring gear 31 of a final reduction gear device mechanism. The final reduction gear device is positioned beneath the sub-transmission S in the space between the clutch device 2 and the main transmission M, and adapted to transmit the output of the third main drive shaft 21 to the front wheel through the front axle F.

A device for manipulating the clutch means in the sub-transmission S will be described hereinafter. A shift fork 43 is rotatably supported by a shaft 44, and opposite ends of the fork are slidably engaged with a circumferential groove 42 of a sleeve 41 which is a part of the synchromesh mechanism 12 as a well known mechanism. The lever of the shift fork 43 is pivotally connected to a link 45 of which rear end is connected to a shift rod 46 through a connecting member 47. The shift rod 46 is slidably supported in the housing 33, the rear end of which is connected to a lower end of a shift lever 48 pivotally provided by a pin 49.

In operation, when the shift lever 48 is shifted to the left to the solid line position in FIG. 1b, the shift rod 46 and link 45 are moved to the right, so that the shift fork 43 is shifted to the right to cause engagement of the synchromesh mechanism 12 and the gear 5.

Thus, power of the engine is transmitted through the clutch device 2, first main drive shaft 3, gear 5 and sleeve 41 of synchromesh mechanism 12 to the second main drive shaft 10 without reduction by the sub-transmission S. The main transmission M transmits the rotation of second main drive shaft 10 to the third main drive shaft 21 by means 4-speed transmission gear means. More particularly, if the synchromesh mechanism 20 is actuated by manipulating a shift lever (not shown) to couple the clutch device between the synchromesh mechanism and the gear 18, the third main drive shaft 21 is rotated at the lowest first speed. If the clutch device between the synchromesh mechanism and the gear 19 is engaged, the drive shaft 21 rotates at second speed. Further, engagement of the clutch device between the synchromesh mechanism 24 and the gear 22 will produce the third speed of the drive shaft 21, and engagement of the clutch device between the synchromesh mechanism and the gear 23 causes the fourth speed rotation of the drive shaft 21. The output of the drive shaft 21 is transmitted to the front axle through the gears 30 and 31 to drive the front wheels. Thus, the front wheels are driven in the higher speed range without reduction of the sub-transmission S.

When the shift lever 48 is moved to the right as shown in FIG. 1b, the shift rod 46 and link 45 are moved to the left, so that the shift fork 43 is rotated counterclockwise to engage the synchromesh mechanism 12 with the gear 11. Therefore, the output of the first main drive shaft 3 is transmitted to the second main drive shaft 10 with the reduction by the gears 5, 7, 8 and 11. Thus, the front wheels are driven at the lower speed range.

From the foregoing, it will be understood that the present invention may provide a transmission apparatus comprising a main transmission and a sub-transmission, which sub-transmission is disposed in the space above the final reduction gear drive and between the clutch device of the engine and the main transmission, whereby the transmission apparatus may be manufactured in a small size.

The transmission case 3 is divided into portions forming a main transmission housing and a final reduction gear housing, the latter containing the final reduction gear 31, 30 with the front axle F as well as the sub-transmission S. The housing portions are compactly horizontally aligned one behind the other. A perforated division wall dividing these housing portions forms the bearings 27 for the third main drive shaft 21.

What is claimed is:

1. Transmission apparatus in a motor vehicle having a front axle, comprising
    an engine,
    a clutch device,
    a clutch housing, said clutch device is disposed in said clutch housing,
    a main transmission housing,
    a 2-speed sub-transmission operatively connected to said clutch device, and a main transmission operatively connected to said sub-transmission and disposed in said main transmission housing,
    a final reduction gear connected to the front axle and to said main transmission,
    a final reduction gear housing, said sub-transmission and said final reduction gear directly therebelow with the front axle are disposed in said final reduction gear housing,
    the engine, said clutch housing, said final reduction gear housing and said main transmission housing are disposed substantially horizontally one behind the other.

2. A transmission apparatus for a motor vehicle in which an engine having a crankshaft is longitudinally disposed in front of the front axle of the vehicle comprising
    a transmission case,
    a clutch device co-axially coupled to the crankshaft of the engine,
    a first main drive shaft co-axially connected to said clutch device at a right angle to the front axle, an output end of said first main drive shaft being inserted into said transmission case,
    a second main drive shaft disposed in said transmission case co-axially to said first main drive shaft,
    a sub-transmission means disposed substantially directly above said front axle and for transmitting the output of said first main drive shaft to said second main drive shaft,
    said sub-transmission means having a 2-speed gear ratio including means having counter gears for reducing the rotational speed of said second main drive shaft relative to said first main drive shaft, and a synchromesh means for selectively coupling the output end of said first main drive shaft and an output end of said sub-transmission means to said second main drive shaft, a third main drive shaft is disposed in said transmission case in parallel with said second main drive shaft, a main transmission disposed on both of said second and third main drive shafts, said sub-transmission thereby being operatively disposed in the input side of said main transmission, said main transmission comprising main transmission means including a plurality of reduction gear trains having reduction gears and main transmission synchromesh means on said both of said second and third main drive shafts for selective operative engagement of said main transmission synchromesh means with said reduction gears so as to transmit an output of said second main drive shaft to said third main drive shaft into several selective rotational speeds, respectively, a hypoid pinion mounted on an end of said third main drive shaft, and a final reduction gear operatively connected to said front axle and meshed with said hypoid pinion, said final reduction gear being positioned in said transmission case substantially directly beneath said sub-transmission means.

3. The transmission apparatus as set forth in claim 2, wherein the final reduction gear is closely adjacent and directly faces said sub-transmission at a portion of the final reduction gear.

4. The transmission apparatus as set forth in claim 2, wherein the axis of said third main drive shaft is higher than the axis of the front axle.

5. The transmission apparatus as set forth in claim 2, wherein said main transmission means forms a lower 2-speed transmission device and a higher 2-speed transmission device.

* * * * *

UNITED STATES PATENT AND TRADEMARK OFFICE
CERTIFICATE OF CORRECTION

PATENT NO. : 4,203,498
DATED : May 20, 1980
INVENTOR(S) : Masayuki Kodama

It is certified that error appears in the above-identified patent and that said Letters Patent are hereby corrected as shown below:

Item [73] Assignee name "Fugi" should read --Fuji--

Claim 2, column 5, line 6, before "thereby" insert

--means--

Signed and Sealed this

Second Day of September 1980

[SEAL]

*Attest:*

SIDNEY A. DIAMOND

*Attesting Officer*

*Commissioner of Patents and Trademarks*